(12) United States Patent
Givol et al.

(10) Patent No.: US 10,007,907 B1
(45) Date of Patent: Jun. 26, 2018

(54) METHOD AND SYSTEM OF CAPTURING AN IMAGE OF A CARD

(71) Applicant: CAPITAL ONE SERVICES, LLC, McLean, VA (US)

(72) Inventors: Dan Givol, Washington, DC (US); Anand Kumar, Vienna, VA (US); Patrick Zearfoss, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/714,580

(22) Filed: Sep. 25, 2017

(51) Int. Cl.
*G06Q 20/32* (2012.01)
*G06K 9/46* (2006.01)
*G06K 9/00* (2006.01)
*G06T 7/90* (2017.01)
*G06T 7/11* (2017.01)
*G06Q 20/34* (2012.01)

(52) U.S. Cl.
CPC ..... *G06Q 20/3276* (2013.01); *G06K 9/00463* (2013.01); *G06K 9/4642* (2013.01); *G06Q 20/3223* (2013.01); *G06Q 20/347* (2013.01); *G06T 7/11* (2017.01); *G06T 7/90* (2017.01)

(58) Field of Classification Search
CPC ........... G06Q 20/3276; G06Q 20/3223; G06Q 20/347; G06K 9/4642; G06K 9/00463; G06T 7/90; G06T 7/11
See application file for complete search history.

(56) References Cited

U.S. PATENT DOCUMENTS

| | | | | |
|---|---|---|---|---|
| 2005/0129282 | A1* | 6/2005 | O'Doherty | G07D 7/121 382/112 |
| 2009/0073503 | A1* | 3/2009 | Lebaschi | H04N 1/00326 358/450 |
| 2014/0313529 | A1* | 10/2014 | Nakashio | G06K 15/027 358/1.9 |
| 2014/0376808 | A1* | 12/2014 | Hashimoto | G06K 9/38 382/167 |
| 2016/0125680 | A1* | 5/2016 | White | G07C 9/00103 235/380 |
| 2017/0262822 | A1* | 9/2017 | Conyers | G06Q 20/108 |

\* cited by examiner

*Primary Examiner* — John Strege
(74) *Attorney, Agent, or Firm* — Finnegan, Henderson, Farabow, Garrett & Dunner LLP

(57) ABSTRACT

A method and a system of capturing an image of a card having a magnetic stripe is provided. The method includes obtaining a first image by an imaging device of the card, obtaining a plurality of images of the card via color delta analysis, and obtaining a third image of the card by comparing the first and the plurality of images.

17 Claims, 7 Drawing Sheets

METHOD AND SYSTEM OF CAPTURING AN IMAGE OF A CARD

TECHNICAL FIELD

The disclosed embodiments generally relate to image processing, and more particularly, to method and systems of capturing an image of a card.

BACKGROUND

Electronic devices, such as smartphones, are part of daily lives and have quickly become go-to devices, allowing users to accomplish many tasks with a simple tap and swipe such as, for example, making payments by "mobile wallets." "Mobile wallets" refer to digital versions of real wallets that may contain multiple relationship cards. The term "relationship card," or simply "card", as used herein may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), when the card is read by a card reader. Examples of such cards include credit cards, debit cards, gift cards, rewards cards, frequent flyer cards, merchant-specific cards, discount cards, identification cards, membership cards, and driver's licenses, but are not limited thereto.

To add a card to a mobile wallet, the card must be imaged and digitalized. Conventional approaches for imaging and digitizing cards generally involve edge detection techniques by measuring brightness changes of card images, for example to detect whether the image brightness changes sharply (i.e., brightness discontinuities). However, many cards, such as gift cards, loyalty cards, and credit card, may contain magnetic stripes and/or colorful art work. For example, a magnetic stripe may be located at the top or bottom of a card, and may contain valuable information both below and above the magnetic stripe. For such cards, the conventional approaches may not be able to detect true edges of the cards. Therefore some valuable information of the cards may not be correctly captured.

The present disclosure is directed to addressing one or more of the problems set forth above and/or other problems associated with conventional imaging of cards.

SUMMARY

The disclosed embodiments relate to a method and a system of capturing an image of a card, wherein the card includes a magnetic stripe.

Consistent with a disclosed embodiment, a method of capturing an image of a card having a magnetic stripe may include obtaining a first image of the card by an imaging device, obtaining a plurality of images of the card via color delta analysis, and obtaining a third image of the card by comparing the first and the plurality of images.

Consistent with another disclosed embodiment, a system of capturing an image of a card having a magnetic stripe may include an imaging device and an image processing device. The system may be configured to obtain a first image of the card by the imaging device, obtain a plurality of images of the card via color delta analysis by the image processing device, and obtain a third image of the card by comparing the first and the plurality of images.

Consistent with yet another disclosed embodiment, a non-transitory computer-readable medium storing instructions that, when executed, cause a computer to perform a method of capturing an image of a card having a magnetic stripe. The method may include obtaining a first image of the card by an imaging device, obtaining a plurality of images of the card via color delta analysis, and obtaining a third image of the card by comparing the first and the plurality of images.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
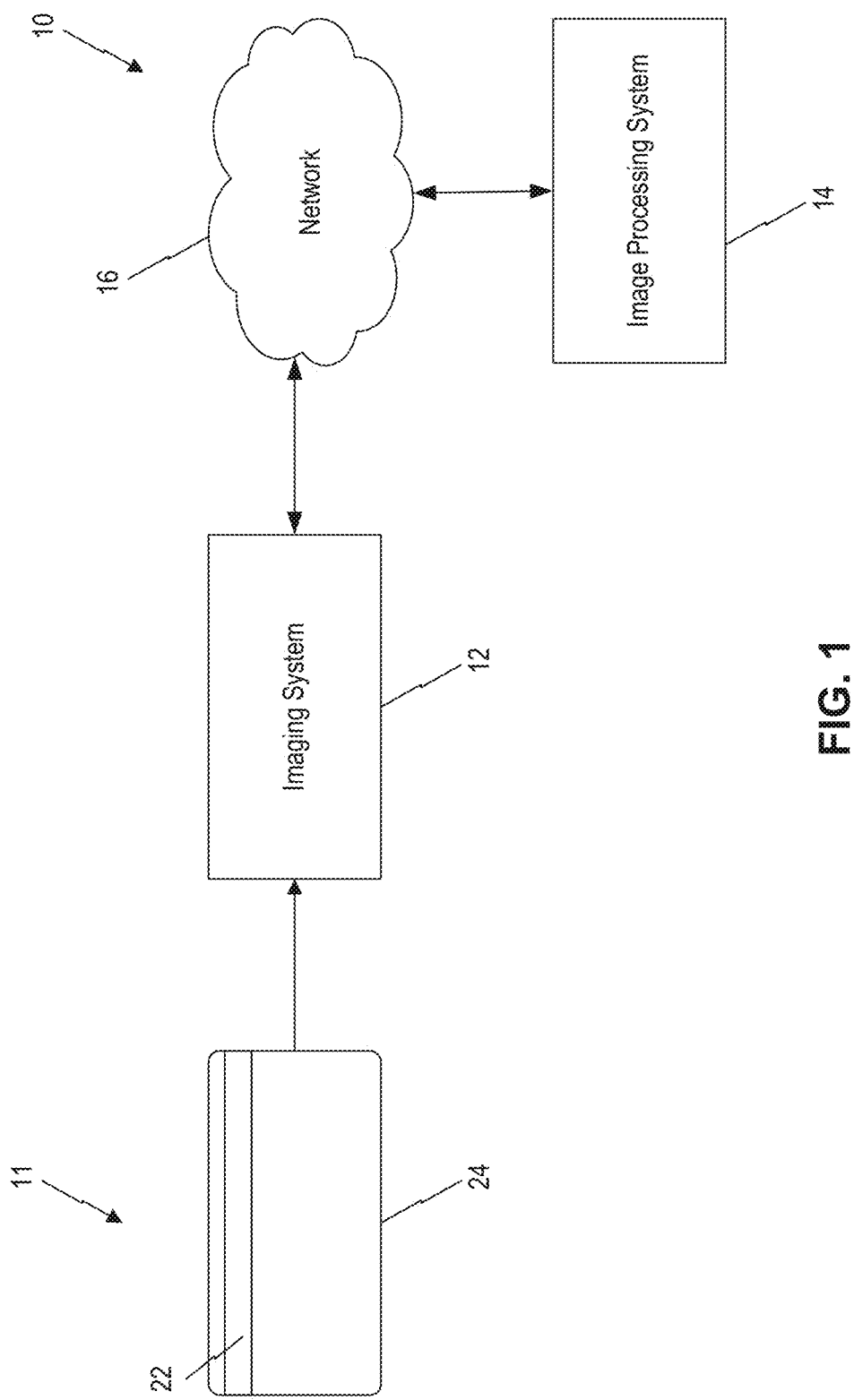
FIG. 1 is a block diagram of an exemplary system of capturing an image of a card, consistent with disclosed embodiments.

FIG. 1 illustrates an exemplary system 10 for capturing and processing an image of a card 11. The physical properties of the card (e.g., size, flexibility, location of various components included in the card) may meet the various international standards, including, e.g., ISO/IEC 7810, ISO/IEC 7811, ISO/IEC 7812, ISO/IEC 7813, ISO/IEC 7816, ISO 8583, ISO/IEC 4909, and ISO/IEC 14443. For example, a card may have a dimension of 85.60 mm (width) by 53.98 mm (height) by 0.76 mm (thickness), as specified in ISO/IEC 7810.

System 10 may include a computing system configured to receive and send information between the components of system 10 and components outside of system 10. System 10 may include an imaging system 12 and an image processing system 14 communicating with each other through a network 16. System 10 may include additional and/or alternative components.

In some embodiments, imaging system 12 may be a portable electronic device associated with a user, such as a smartphone or a tablet equipped with a camera for taking a live video or still image of a card. In other embodiments, imaging system 12 may include one or more computer systems associated with an entity. For example, imaging system 12 may be associated with an entity that provides imaging service (e.g., a photo studio). Imaging system 12 is configured to perform some or all the steps of the methods of capturing an image of a card, which will be described in detail below.

Image processing system 14 may include one or more computer systems associated with an entity that provides image processing services. For example, the entity may be a user, a cloud computing provider, an image service provider, a credit card issuer, a government agency, or other type of service entity that is capable of processing images of cards. Image processing system 14 is configured to perform some or all the steps of the methods of processing an image of a card, which will be described in detail below. For example, a credit card issuer may allow its customers to digitalize credit cards for mobile wallets. In this case, the credit card issuer may provide imaging processing system 14 for further processing images of credit cards provided by the customers. Alternatively, the credit card issuer may refer to a third party for providing imaging processing system 14. In some embodiments, imaging system 12 may also provide image processing services.

Network 16 may include any type of network configured to facilitate communications and data exchange between components of system 10, such as, for example, image processing system 14 and imaging system 12. Network 16 may include a Local Area Network (LAN), or a Wide Area Network (WAN), such as the Internet. Network 16 may be a single network or a combination of networks. Network 16 is not limited to the above examples, and system 10 may be implemented with any type of network that allows entities (shown and not shown) of system 10 to exchange data and information. In some embodiments, a portion or an entire capability of image processing system 14 and imaging system 12 may be implemented in an application that may be loaded to a user device or distributed over a network.

System 10 may be configured to capture and process an image of card 11 to digitalize card 11. In some embodiments, an entity such as a credit card issuer may provide card 11 to a customer for use in conducting transactions, including online transactions through a mobile wallet associated with a financial service account held by the customer. In some embodiments, the entity who provides card 11 may also provide image processing system 14. In some embodiments, card 11 and image processing system 14 may be provided by different entities. To digitalize card 11, imaging system 12 may capture a live video or still images of card 11 to obtain information contained in card 11, such as credit card number, card holder name, card expiration date, etc. Imaging system 12 may communicate with image processing system 14 via network 16 to transfer the live video or still images for further processing in image processing system 14. In some embodiments, imaging system 12 may subsequently receive a processed image of card 11 from image processing system 14 and present the processed image to the user for verification and/or selection.

In some embodiments card 11 may further include an information component 22 disposed on or in a card body 24.

As used herein, an "information component" may be one or more devices and/or elements configured to receive, store, process, provide, transfer, send, delete, and/or generate information. For example, information component 22 may be a microchip (e.g., an Europay, MasterCard, and Visa (EMV) chip), a communication device (e.g., Near Field Communication (NFC) antenna, Bluetooth® device, WiFi device), a magnetic strip, a barcode, Quick Response (QR) code, etc. Information component 22 may be secured (or affixed, attached) to card body 24 in such a way that allows card body 24 to carry information component 22 while maintaining a utility of information component 22 (i.e., allowing information component 22 to interact with card reader). Herein, the utility of information component 22 indicates that information component 22 functions properly, for example, a card containing RFID (radio frequency identification) shielded by a layer can be properly read by an RFID reader through the layer.

Figure 2:
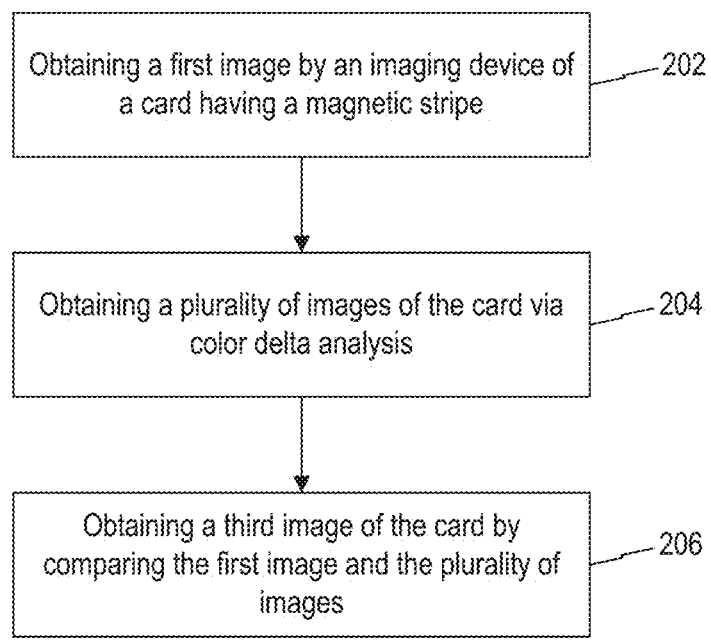
FIG. 2 is a flow chart of an exemplary method of capturing an image of a card having a magnetic stripe, consistent with disclosed embodiments.

FIG. 2 is a flow chart of an exemplary method 200 of capturing and processing an image of a card having a magnetic stripe. Method 200 may be implemented in system 10 of FIG. 1 and may include the following steps.

In step 202, an image (i.e., a first image) of card 11 having magnetic stripe 22 is obtained by imaging system 12. Magnetic stripe 22 may be located on a top or bottom portion of card 11, for example, at a location about 80% height of card 11. In some embodiments, card 11 may also include card art work.

In this exemplary embodiment, imaging system 12 may include a smartphone (e.g., iPhone 4 and above) having an imaging device, an operating system, and software libraries (e.g., Rect-Detect, Core Image) to assist in capturing the image of card 11. In some embodiments, imaging system 12 may include other electronic devices, (e.g., a tablet) and associated operating system and libraries for obtaining and initially processing the image of card 11.

First, an image of card 11 is captured. Data representative of the image is then produced from the captured image. In conventional card image capture systems, the presence of magnetic stripe 22 may inhibit the accurate recognition of the boundaries of the card in the captured image. Accordingly, the disclosed system first analyzes the image data to determine if a magnetic stripe is included, and provides appropriate processing to generate and store a first version of the card image data.

In step 204, color delta analysis is employed to generate a first plurality of versions of the captured card image data (e.g., representative of a plurality of images of card 11). These versions may be obtained by applying several filters to the original image data. For example, CoreImage filters included as part of the Apple IOS operating system may be used. Specifically, the card image data may be processed by a grayscale filter with contrast increased, a filter with contrast highly enhanced, a combination filter that applies edge detection and overlays the edge enhancement on the original image, and a filter that simply returns a clean image of the original image. As used herein, a "clean" image refers to an image obtained by filtering the original image to remove undesireable image noise Next, true edges of card 11 are detected by performing color delta analysis on the filtered versions of the card image data. As used herein, "color delta" refers to a difference between two color values, for example, a difference between a RGB value of a first pixel and a RGB value of a second pixel.

In step 206, a third version of the card image data is generated by comparing the first version of the card image data and the multiple filtered versions of the card image data. In this exemplary embodiment, the first version of the card image data is compared with each of the multiple filtered versions of the card image data, discarding one image after each comparison, such that a second plurality of versions of the card image data are generated as a result of the comparisons. The second plurality of versions of images are images having a higher contrast. The third version is then determined by using mean values of the second plurality of the card image data. A confirmation image (i.e., a third image of card 11) represented by the third version of card image data may then be presented to the user for verification and/or selection to confirm that the presented image includes complete information of the card.

Figure 3:
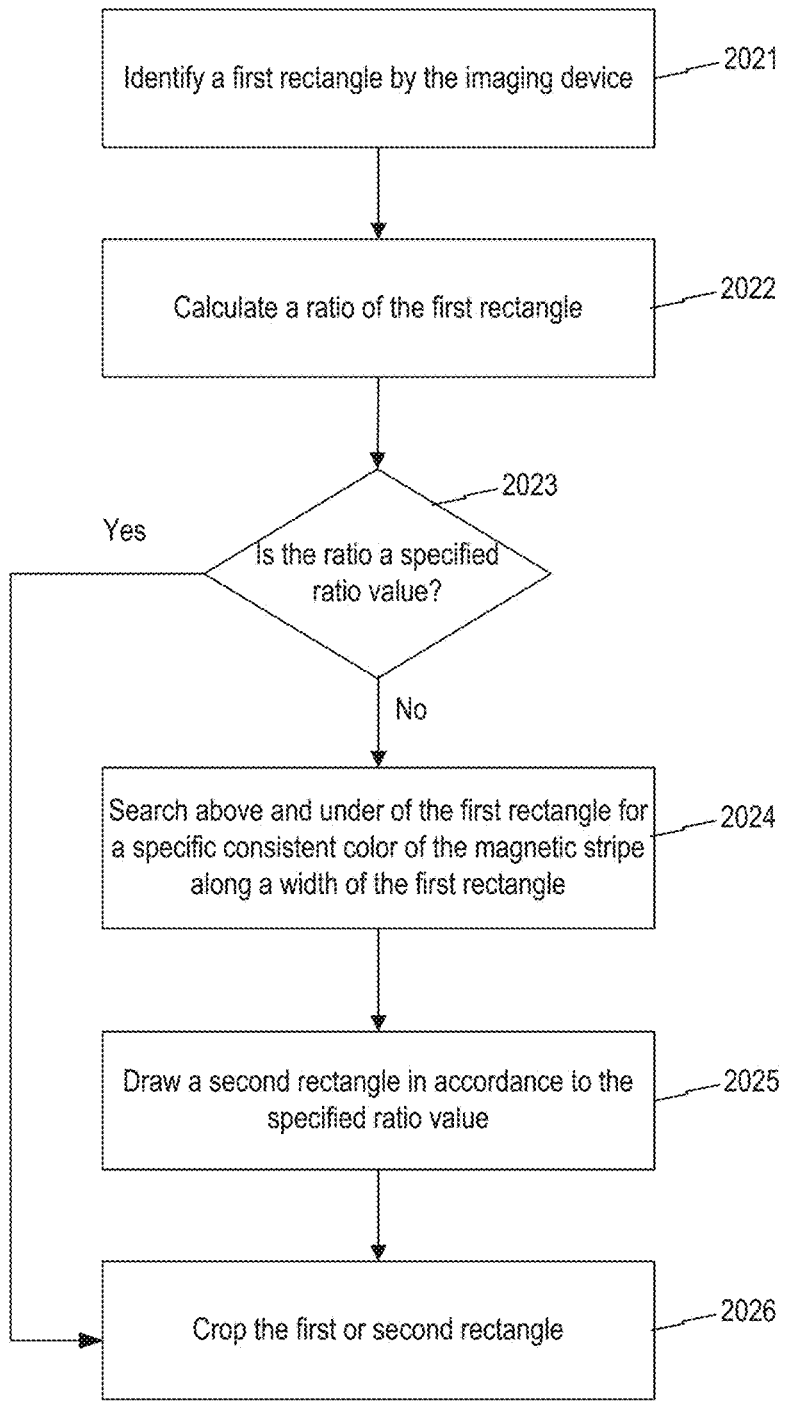
FIG. 3 is a flow chart of another exemplary method of capturing an image of a card having a magnetic stripe, consistent with disclosed embodiments.
Figure 4A:
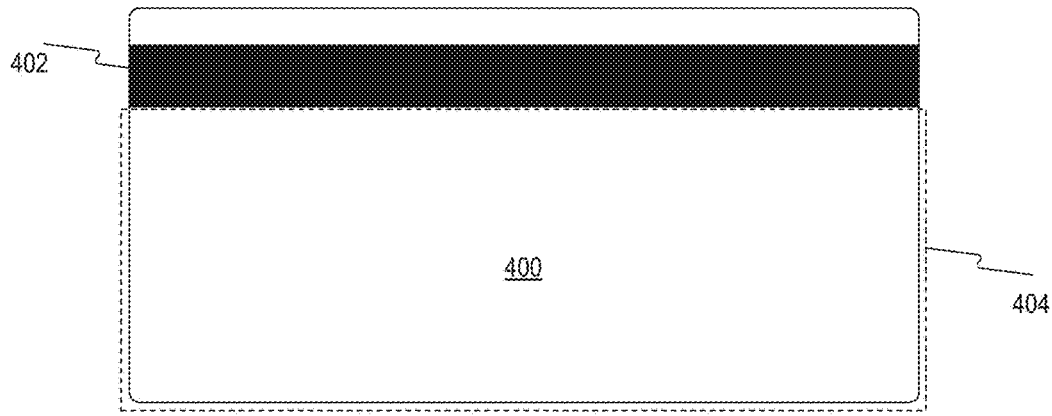
FIG. 4A is a schematic diagram of a card image without a magnetic stripe captured, consistent with disclosed embodiments.

Step 202 in FIG. 2 may further include substeps. FIG. 3 is a flow chart of an exemplary method 300 of capturing and processing an image of a card, which may be in combination with step 202 in FIG. 2, and may include the following steps In step 2021, a first rectangle is drawn and identified by imaging system 12 from the captured image data. In this exemplary embodiment, an iPhone video camera and RectDetect library is used to search the captured image data for a card shape. The first rectangle may cover the entire card or just a portion of the card. As shown in FIG. 4A, a first rectangle 404 covers only a portion of card 400 having a magnetic stripe 402.

In step 2022, a ratio of the first rectangle is calculated, for example, the ratio being a ratio of width to height of the rectangle.

In step 2023, the calculated ratio is compared to a pre-specified card ratio value. For example, the pre-specified card ratio value may be 1.6179, i.e., the ratio of a standard credit card. If the calculated ratio is about the same as the pre-specified ratio value, the method determines that a complete image of the card has been obtained. Method 300 will proceed to step 2026 in which the first image of card 11 is generated by cropping along the first rectangle. The first image may be considered an image covering the entire card, and may contain some background that is not part of the card itself.

Figure 4B:
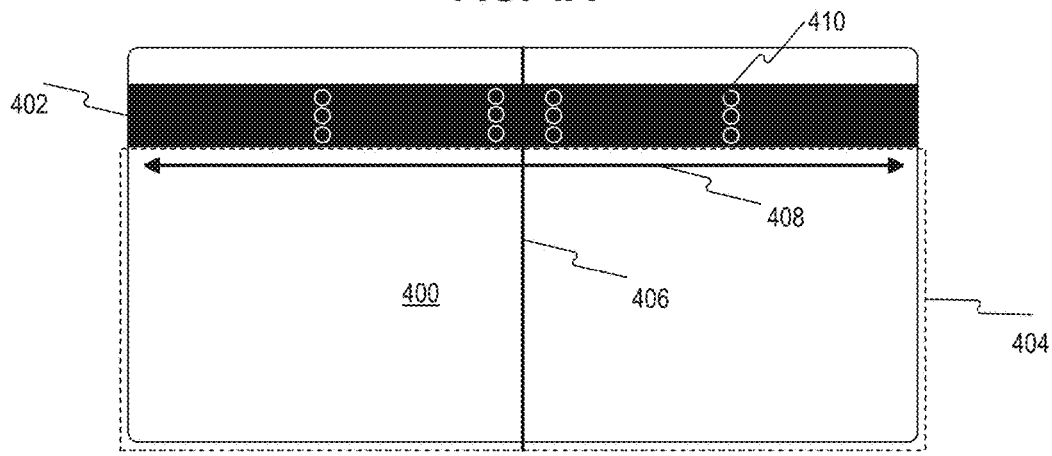
FIG. 4B is a schematic diagram of the card in FIG. 4A with the magnetic stripe identified, consistent with disclosed embodiments.

If the calculated ratio is substantially different than the pre-specified ratio value, for example, in a range of 1.35-1.6178 as shown in FIG. 4A, method 300 determines that additional processing is required. Method 300 will then proceed to step 2024, in which a color analysis is performed on the first rectangle to search for a specific color of the magnetic stripe. For example, a specific consistent color of the magnetic stripe may be searched for in the captured card image data immediate above and below of the first rectangle, along a width of the first rectangle. As shown in FIG. 4B, a line 406 may be drawn along the middle of the first rectangle and the color sampled along the width of the rectangle as indicated by a double arrow line 408. The locations for color sampling may be selected as shown by circles 410 such that the dimension of the magnetic stripe can be identified. For example, if the sampled color matches the specific color of the magnetic stripe (e.g, dark brown), color sampling will be continued in different positions. If the sampled color is consistent along the top or bottom of the first rectangle, the magnetic stripe is identified.

Figure 4C:
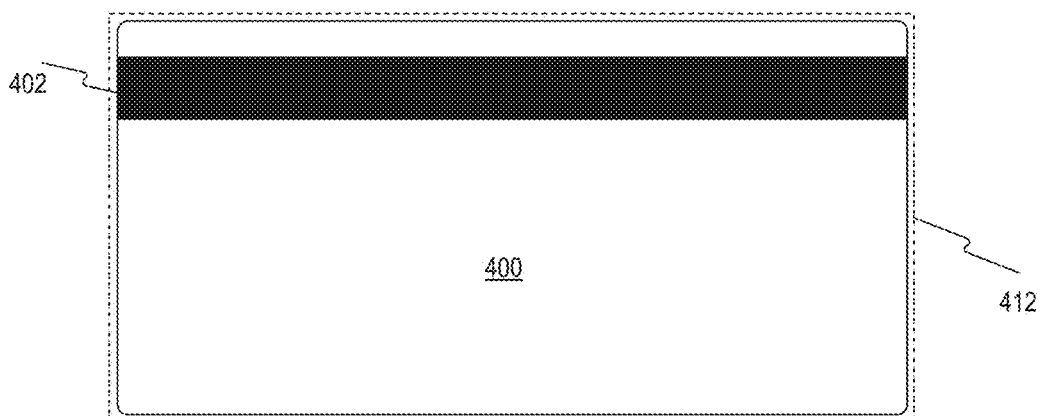
FIG. 4C is a schematic diagram of the card image in FIG. 4A with the magnetic stripe captured, consistent with disclosed embodiments.

In step 2025, a second rectangle is drawn in accordance to the pre-specified ratio value. As shown in FIG. 4C, a second rectangle 412 may be drawn based on the pre-specified ratio value to cover the entire card including the identified magnetic stripe 402.

In step 2026, the first image is obtained by cropping along the second rectangle. The first image may be considered an image covering the entire card, and may contain some background that is not part of the card itself.

Figure 5:
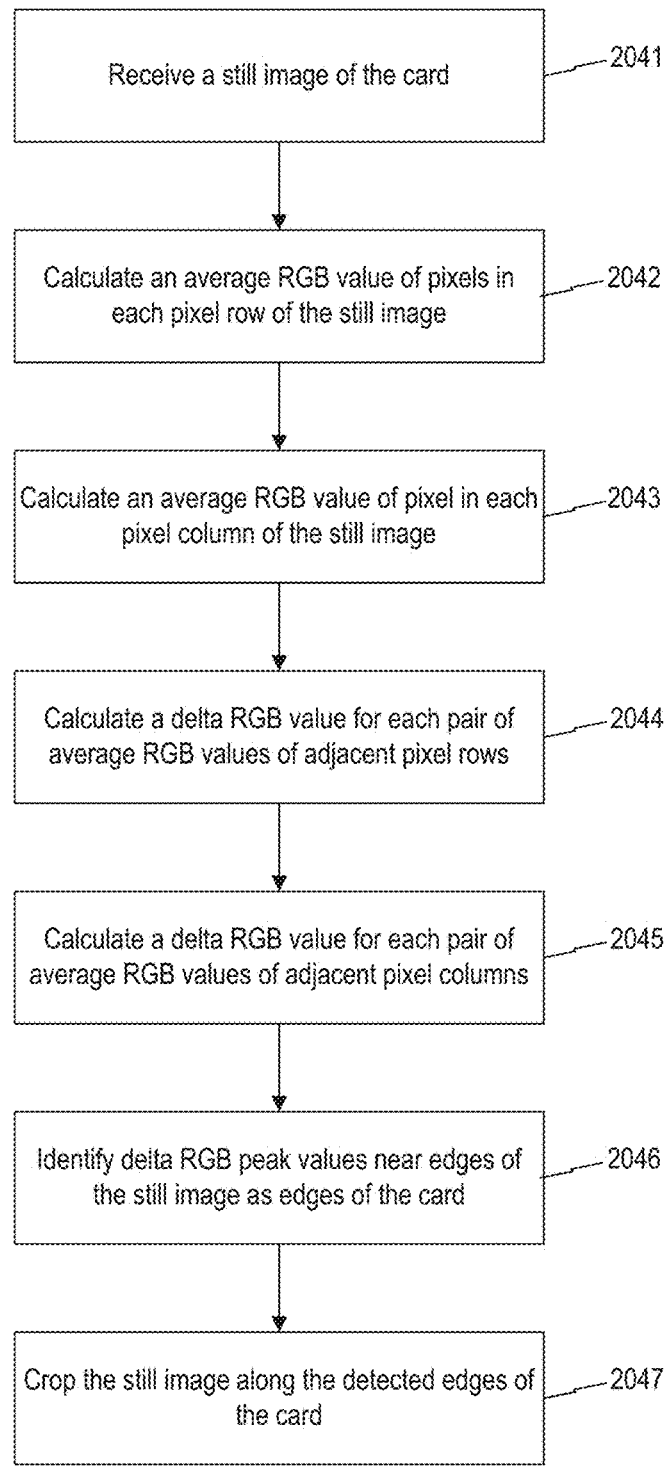
FIG. 5 is a flow chart of yet another exemplary method of capturing an image of a card having a magnetic stripe, consistent with disclosed embodiments.

In some embodiments, step 204 in FIG. 2 may further include substeps. FIG. 5 shows a flow chart of an exemplary method 500 of capturing and processing an image of a card, which may be in combination with step 204 in FIG. 2, and may include the following steps.

In step 2041, image data of a card is received. The received image data (e.g., representative of a still image of the card) may be provided by the user, or may be received from imaging system 12.

In step 2042, an average RGB value of pixels in each pixel row of the received image data is calculated. A map correlating average RGB values with corresponding pixel rows of the received image data may be generated. In this exemplary embodiment, the average RGB value of pixels in each pixel row of the received image data may be calculated using built-in CoreImage filters provided by Apple in the IOS operating system.

In step 2043, an average RGB value of pixels in each pixel column of the received image data is calculated. A map correlating average RGB values with corresponding pixel columns of the received image data may be generated. Similarly, the average RGB value of pixels in each pixel column of the received image data may be calculated using built-in CoreImage filters of 10S.

In step 2044, a delta RGB value for each pair of average RGB values of adjacent pixel rows is calculated. A map correlating delta RGB values with corresponding pixel rows of the received image data may be generated.

In step 2045, a delta RGB value for each pair of average RGB values of adjacent pixel columns is calculated. A map correlating delta RGB values with corresponding pixel columns of the received image data may be generated.

Figure 6:
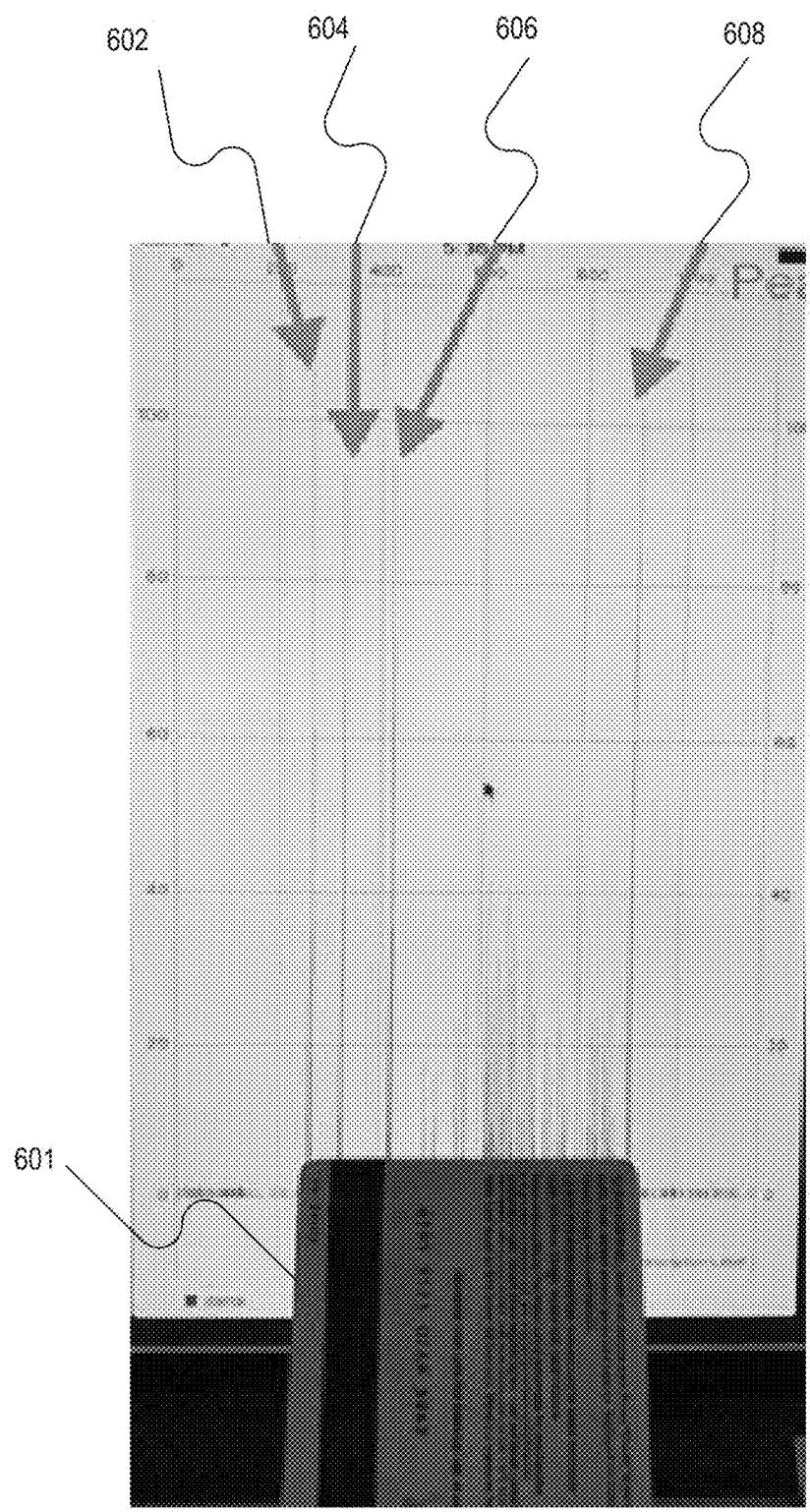
FIG. 6 is a schematic diagram of a color analysis result, consistent with disclosed embodiments.

In step 2046, delta RGB peak values near edges of the received image data are identified and determined as edges of the card. The delta RGB peak values may be high points close to the edges of the received image data where colors change most quickly. FIG. 6 shows an exemplary map correlating delta RGB values with corresponding pixel rows of the still image. As shown in FIG. 6, delta RGB peak values 602, 604, 606, and 608 respectively correspond to a left edge of card 601, a left edge of magnetic stripe of card 601, a right edge of magnetic stripe of card 601, a right edge of card 601, respectively.

In step 2047, the received image data is cropped along the detected edges of the card. The resultant image data may be one of the plurality of versions of image data in step 204 of FIG. 2

In some embodiments, method 300 may further include running a high pass filter to remove meaningless noise in the delta RGB values.

In some embodiments, the delta RGB value may be a Euclidean distance between colors. As used herein, a Euclidean distance refers to a distance defined as $\sqrt{(R_2-R_1)^2+(G_2-G_1)^2+(B_2-B_1)^2}$, where $R_1$, $R_2$, $G_1$, $G_2$, $B_1$, $B_2$ are red, green, and blue color values of a first pixel and a second pixel, respectively. In some embodiment, other distances to measure a delta RGB value may also be applied.

In some embodiments, method 300 may include running an additional pass at rectangle detection on the received image data to potentially compensate for any movement that may have occurred between the last frame of rectangle detection and the capture of the full size image. The result of this additional pass will be further processed.

In some embodiments, method 300 may include deskewing a slightly expanded version of detected rectangle 412 (FIG. 4C). The expansion ensures that at least some amount of background around the actual card is included in the rectangle. Additional rectangle detection may be performed on the de-skewed image to capture a still image of the card. This may get a precise location of the card in the rectangle. If not, card bounds may be determined by inverting the scaling (i.e., a card ratio) mentioned previously.

In some embodiments, method 300 may further include running the de-skewed or cropped image with background through several filters, for example, grayscale filter with contrast increased, a filter with contrast highly enhanced, a combination filter that applies edge detection and overlays the edge enhancement over the original image, or a filter that simply returns a clean image of the original image.

In some embodiments, for each of the images obtained after applying filters, steps 2041-2047 of method 300 are applied to obtain the plurality of images of step 204 in FIG. 2.

Figure 7:
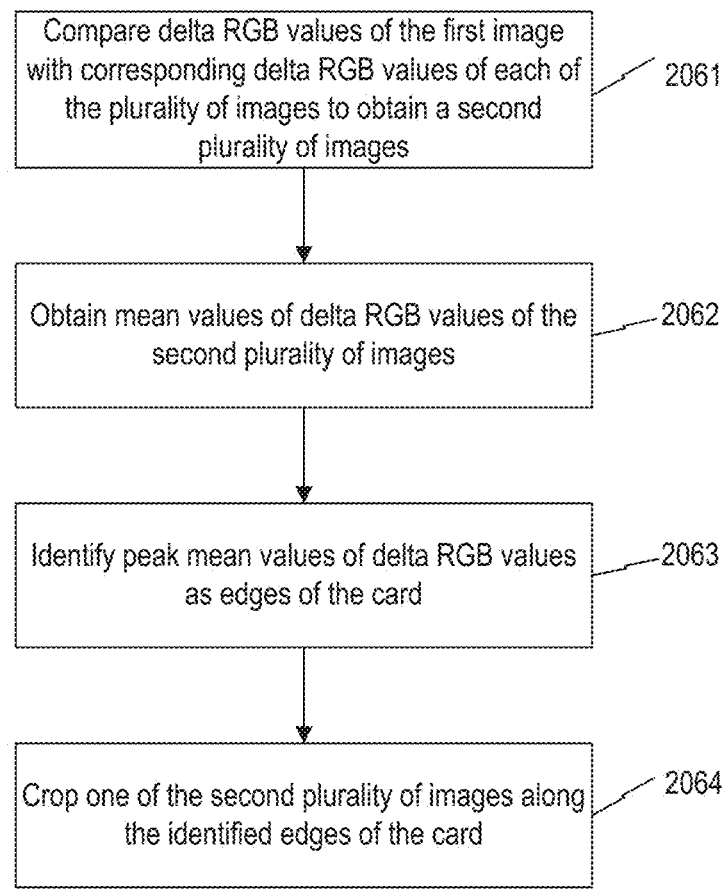
FIG. 7 is a flow chart of still yet another exemplary method of capturing an image of a card having a magnetic stripe, consistent with disclosed embodiments.

In some embodiments, step 206 in FIG. 2 may further include substeps. FIG. 7 shows a flow chart of an exemplary method 700 of capturing and processing an image of a card, which may be in combination with step 204 in FIG. 2, and may include the following steps In step 2061, delta RGB values of the first image in step 202 are compared with corresponding delta RGB values of each of the plurality of images in step 204 to obtain a second plurality of images. One image will be discarded from each comparison if the value is off by more than 1%. As a result, one image results from each comparison to produce the second plurality of images (i.e., representative of a second plurality of image data).

In step 2062, mean values of delta RGB values of the second plurality of images are determined. As used here, a mean value of delta RGB refers an average delta RGB value averaged over corresponding delta RGB values of the second plurality of images.

In step 2063, peak mean values of delta RGB values are identified and determined as edges of the card.

In step 2064, one of the second pluralities of images is cropped along the identified edges of the card to produce the third image of the card in step 206 of FIG. 1. The third image may be a final image of card 11, and may also be a desirable image by the user. This third image will be added to mobile wallet.

Accordingly, some embodiments of the present invention may recognize a card in its entirety without cropping any of the edges. The card can be automatically cropped, thereby reducing the need for a user to capture the image and remove the background. Further, the disclosed embodiments may provide a higher success rates when capturing a card with a magnetic stripe. Additionally, the disclosed embodiments may be used to identify the legitimacy of documents and identification card. The color delta analysis may be used to look for patterns in images without having to scan them manually.

While illustrative embodiments have been described herein, the scope includes any and all embodiments having equivalent elements, modifications, omissions, combinations (e.g., of aspects across various embodiments), adaptations or alterations based on the present disclosure. For example, the order of the steps of the above exemplary method may be rearranged in any preferred or suitable order, or any step may be removed or added.

The disclosed embodiments may also provide a non-transitory computer-readable medium having stored thereon instructions that, when executed by a processor of a computer, cause the computer to perform the above-described methods. The non-transitory computer-readable medium may be or include any type of volatile or non-volatile memory device, for example including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A method of capturing an image of a card having a magnetic stripe, comprising:
    obtaining first image data of the card by an imaging device;
    obtaining a plurality of groups of second image data of the card via color delta analysis, the color delta analysis comprising:
        calculating average RGB values of pixels in pixel rows of the first image data;
        calculating average RGB values of pixels in pixel columns of the first image data;
        calculating delta RGB values for pairs of average RGB values of adjacent pixel rows;
        calculating delta RGB values for pairs of average RGB values of adjacent pixel columns;
        identifying delta RGB peak values near edges of a still image as edges of the card; and
        cropping the first image data along the detected edges of the card;
    comparing the first image data with each of the plurality of groups of second image data, discarding one group of image data after each comparison, such that a plurality of versions of corresponding image data are generated as a result of the comparisons;
    obtaining third image data of the card based on mean values of the plurality of versions of corresponding image data; and
    presenting a confirmation image represented by the third image data to the user for verification that the presented confirmation image includes correct information of a complete image of the card.

2. The method of claim 1, wherein obtaining the first image data comprises:
    identifying a first rectangle in the first image data;
    calculating a ratio of the first rectangle;
    determining whether the calculated ratio is equal to a specified ratio value;
    if the calculated ratio is not equal to the specified ratio value, searching above and below the first rectangle for a specific consistent color of the magnetic stripe along a width of the first rectangle;
    drawing a second rectangle in accordance to the specified ratio value, the second rectangle containing the magnetic stripe; and
    cropping along the second rectangle to obtain the first image data.

3. The method of claim 1, wherein obtaining the first image data comprises obtaining the first image data using a mobile device having an image library.

4. The method of claim 1, wherein at least one delta RGB value is a Euclidean distance.

5. The method of claim 1, further comprising applying at least one filter of:
   a grayscale filter with first increase in contrast;
   a filter with a second increase in contrast, the second increase in contrast being greater than the first increase in contrast;
   a filter applying edge detection and overlaying edge enhancement over the first image data; and
   a filter returning a clean image.

6. The method of claim 1, wherein obtaining the third image data further comprises:
   comparing delta RGB values of the first image data with corresponding delta RGB values of each of the plurality of groups of second image data to obtain a second plurality of groups of corresponding image data having higher contrast;
   obtaining mean values of delta RGB values of the second plurality of groups of corresponding image data;
   identifying peak values of the mean values as edges of the card; and
   cropping one of the groups of corresponding image data along the identified edges of the card to obtain updated third image data.

7. A system of capturing an image of a card having a magnetic stripe, comprising:
   an imaging device; and
   an image processing device, the processing device being configured to:
      generate first image data of the card from image data received from the imaging device;
      generate a plurality of groups of second image data of the card via color delta analysis, the color delta analysis comprising:
         calculating average RGB values of pixels in pixel rows of the first image data;
         calculating average RGB values of pixels in pixel columns of the first image data;
         calculating delta RGB values for pairs of average RGB values of adjacent pixel rows;
         calculating delta RGB values for pairs of average RGB values of adjacent pixel columns;
         identifying delta RGB peak values near edges of a still image as edges of the card; and
         cropping the first image data along the detected edges of the card;
      generate third image data of the card by comparing the first image data with each of the plurality of groups of second image data, discarding one group of image data after each comparison, such that a plurality of versions of corresponding image data are generated as a result of the comparisons, wherein the third image data is based on mean values of the plurality of versions of corresponding image data; and
      present a confirmation image represented by the third image data to the user for verification that the presented confirmation image includes correct information of a complete image of the card.

8. The system of claim 7, wherein the image processing device is further configured to:
   define a first rectangle in the first image data;
   calculate a ratio of the first rectangle;
   determine whether the calculated ratio is equal to a specified ratio value;
   if the calculated ratio is not equal to the specified ratio value, search above and below the first rectangle for a specific consistent color of the magnetic stripe along a width of the first rectangle;
   define a second rectangle in accordance to the specified ratio value, the second rectangle containing the magnetic stripe; and
   crop along the second rectangle to obtain the first image data of the card.

9. The system of claim 7, wherein the imaging device is a mobile device having an image library.

10. The system of claim 7, wherein at least one delta RGB value is an Euclidean distance.

11. The system of claim 7, the image processing device being further configured to apply at least one filter of:
   a grayscale filter with a first increase in contrast;
   a filter with second increase in contrast, the second increase in contrast being greater than the first increase in contrast;
   a filter applying edge detection and overlaying edge enhancement over the first image data; and
   a filter returning a clean image.

12. The system of claim 7, the image processing device being further configured to:
   compare delta RGB values of the first image data with corresponding delta RGB values of each of the plurality of groups of second image data to obtain a second plurality of groups of corresponding image data having higher contrast;
   obtain mean values of delta RGB values of the second plurality of groups of corresponding image data;
   identify peak values of the mean values as edges of the card; and
   crop one of the groups of corresponding image data along the identified edges of the card to obtain updated third image data.

13. A non-transitory computer-readable medium having stored therein instructions that, when executed by a processor of a computer, cause the computer to perform a method of capturing an image of a card having a magnetic stripe, the method comprising:
   obtaining first image data of the card by an imaging device;
   obtaining a plurality of groups of second image data of the card via color delta analysis, the color delta analysis comprising:
      calculating average RGB values of pixels in pixel rows of the first image data;
      calculating average RGB values of pixels in pixel columns of the first image data;
      calculating delta RGB values for pairs of average RGB values of adjacent pixel rows;
      calculating delta RGB values for pairs of average RGB values of adjacent pixel columns;
      identifying delta RGB peak values near edges of a still image as edges of the card; and
      cropping the first image data along the detected edges of the card;
   comparing the first image data with each of the plurality of groups of second image data, discarding one group of image data after each comparison, such that a plurality of versions of corresponding image data are generated as a result of the comparisons;

obtaining third image data of the card based on mean values of the plurality of versions of corresponding image data; and presenting a confirmation image represented by the third image data to the user for verification that the presented confirmation image includes correct information of a complete image of the card.

14. The medium of claim 13, wherein obtaining the first image data comprises:

identifying a first rectangle by the imaging device;

calculating a ratio of the first rectangle;

determining whether the calculated ratio is equal to a specified ratio value;

if the calculated ratio is not equal to the specified ratio value, searching above and below the first rectangle for a specific consistent color of the magnetic stripe along a width of the first rectangle;

drawing a second rectangle in accordance with the specified ratio value, the second rectangle containing the magnetic stripe; and cropping along the second rectangle to obtain the first image data.

15. The medium of claim 13, wherein the first image is captured by a mobile device having an image library.

16. The medium of claim 13, the method further comprising applying at least one filter of:

a grayscale filter with a first increase in contrast;

a filter with a second increase in contrast, the second increase in contrast being greater than the a first increase in contrast;

a filter applying edge detection and overlaying edge enhancement over the first image data; and a filter returning a clean image.

17. The medium of claim 13, wherein obtaining the third image data comprises:

comparing delta RGB values of the first image data with corresponding delta RGB values of each of the plurality of groups of second image data to obtain a second plurality of groups corresponding image data having higher contrast;

obtaining mean values of delta RGB values of the second plurality of groups corresponding image data;

identifying peak values of the mean values as edges of the card; and cropping one of the groups corresponding image data along the identified edges of the card to obtain updated third image data.

* * * * *